TELEPHONE LINE CONCENTRATOR SYSTEM

Filed June 6, 1962 4 Sheets-Sheet 1

INVENTORS G. FISHMAN
R. E. LE CRONIER
C. W. ZEBE

BY S E Hollander

ATTORNEY

TELEPHONE LINE CONCENTRATOR SYSTEM

Filed June 6, 1962 4 Sheets-Sheet 2

INVENTORS G. FISHMAN
R. E. LE CRONIER
C. W. ZEBE
BY
SE Hollander
ATTORNEY

Jan. 18, 1966 G. FISHMAN ETAL 3,230,313

TELEPHONE LINE CONCENTRATOR SYSTEM

Filed June 6, 1962 4 Sheets-Sheet 3

INVENTORS G. FISHMAN
R. E. LE CRONIER
C. W. ZEBE
BY S E Hollander
ATTORNEY

TELEPHONE LINE CONCENTRATOR SYSTEM

INVENTORS G. FISHMAN
R. E. LE CRONIER
C. W. ZEBE
BY
S E Hollander
ATTORNEY 3,230,313

TELEPHONE LINE CONCENTRATOR SYSTEM

George Fishman, Bronx, N.Y., and Richard E. Le Cronier, Sea Bright, and Charles W. Zebe, New Shrewsbury, N.J., assignors to Bell Telephone Laboratories, Incorporated, New York, N.Y., a corporation of New York Filed June 6, 1962, Ser. No. 200,421
13 Claims. (Cl. 179—18)

This invention relates to telephone switching systems and more particularly to arrangements for reducing the time required for establishing connections in telephone line concentrator systems.

As is well known, telephone line concentrators have been utilized to reduce outside plant costs by "concentrating" a larger number of subscriber lines over a smaller number of concentrator trunks to a central office. A remote concentrator switching unit is utilized to establish connections between service requesting lines and idle trunks under control of the central office.

Univeral concentrators which are compatible with most common types of switching systems are arranged in a configuration which resembles in outline form two triangles in which the apices are connected by the concentrator trunks. One of the triangles represents the remote switching unit and has connected to the base thereof the subscriber lines to be concentrated. The remaining triangle is disposed in the central office and has extending from the base thereof a number of connections equal in number to the lines to be concentrated. These connections in turn extend to the conventional physical line terminations in the central office at which the subscriber lines would have been terminated if they were connected directly to the office rather than through a concentrator.

An advanced universal line concentrator of this type is disclosed in J. C. Ewin Patent 3,022,382, issued February 20, 1962. Although completely operative and useful, an inconvenient time delay encountered in the utilization of the above-referred-to concentrator system occurs during each service request origination. The conventional operation on an originating or service request call in the Ewin concentrator system is as follows:

When the calling subscriber goes off hook to originate a call, signaling equipment in the remote unit is actuated to automatically transmit to the central office three distinct patterns of code signals indicative of the identification of the line requesting service. On reception of this information, the control unit or central office portion of the line concentrator responds by registering the line identification and selecting an idle trunk for connection to the service requesting line. Thereafter appropriate switching equipments in both the remote and control units are energized to effectuate a connection from the service requesting line over the selected idle trunk to the conventional line terminal at the central office adverted to above.

At this time the conventional line terminals at the central office detect the receiver off-hook condition and conventional arrangements for selecting an idle originating register to receive dial pulsing are undertaken.

In summary, the following time delays were encountered in the above-mentioned procedure utilized in the Ewin concentrator system:

(1) Initially, after the first receiver off-hook condition, time was required for the remote unit to apprise the control unit in the central office of the line requesting service by the three successive signal bursts referred to above;

(2) Time was expended in the selection of an idle trunk for connection to the service requesting line;

(3) Additional time was utilized in operating the various switches required to establish a connection between the idle trunk and the service requesting line; and (4) Further time was utilized in selecting an idle originating or dial pulse register which in turn delivered dial tone to the calling subscriber.

Thus, dial tone is not available and dial pulsing is not feasible until all of the above time intervals have elapsed.

It is therefore an object of this invention to truncate the time required to provide the connection of a dial pulse register to a service requesting line in a telephone concentrator system.

These and other objects of the invention have been achieved in an arrangement wherein the sequential pattern of operations tabulated above have been interrupted to establish patterns which permit concurrent rather than sequential time lapses. In essence, it was discovered that although each of the above operations and its attendant time delay is essential to the operation of a concenrator circuit the over-all time required may be truncated by breaking into the conventional sequential pattern of operations and prematurely initiating the operation of certain of the later functions to permit simultaneous or concurrent functioning in different portions of the system, thus permitting each of the individual operations to be completed in the usual time required therefor but reducing the over-all time of operation significantly.

The present invention contemplates the usual transmission of signal information representing the calling line from the remote switching unit to the central office. Ordinarily, upon reception of this information, an idle trunk is selected in the control unit for connection to the service requesting line. In lieu of this conventional or classical form of operation, the present arrangement provides, upon the reception of the signal information representing the identity of the calling line, for the immediate energization of the conventional line terminal in the central office associated with the calling line. Upon energization of the conventional line terminal, an idle dial tone register or called station identity register is summoned in acordance with the usual practice. Significantly, however, although a dial pulse register is being summoned, at this time no connection as yet exists from the conventional line terminal to the calling line since the procedure for selecting an idle trunk is still underway.

This facility for initiating the connection of a dial pulse register, even though the line is still fully divorced from any speech trunk connection to the office, represents a significant departure from prior concentrator operation. In fact, this type of procedure has in the past been carefully avoided on traditional grounds since the threat exists that a dial pulse register may be summoned while the line is divorced from the office and under conditions where the line cannot under any circumstances be connected to the office (e.g., in view of an all-trunks busy condition). This possibility has been considered and rejected in the present invention in view of the incorporation of timed release equipment in the dial pulse registers which prevent their seizure for undue periods during an all-trunks busy condition.

It is manifest from the above that the ability to summon a dial pulse register while the line is still fully divorced from the office permits the concurrent summoning of the register and selection of an idle trunk which under certain circumstances provides for the connection of the dial pulse register to the conventional line terminals in the office even prior to the extension of a trunk connection to the calling line thereby affording immediate dial tone to the calling subscriber as soon as the trunk connection is completed. In any event, the over-all time required is significantly foreshortened by permitting the concurrent or simultaneous seizure of the dial pulse register and selection and connection of an idle concentrator trunk.

These and other objects and features of the invention may be more readily comprehended from an examination of the following specification, attached drawing and appended claims in which:

FIG. 1 shows an outline diagram describing the manner of incorporation of the present invention in the universal line concentrator disclosed in the above-referred-to patent of J. C. Ewin;

FIG. 2 shows an outline diagram describing the relationship between the present invention and a conventional No. 5 crossbar office as described in Patent 2,585,904 of A. J. Busch of February 19, 1952;

FIGS. 3 and 4 show the details of the circuitry for providing concurrent selection of an idle trunk and summoning of a dial tone register; and FIG. 5 shows the relationship of FIGS. 3 and 4.

Referring now to FIG. 1, an over-all diagram of the universal line concentrator disclosed in J. C. Ewin, Patent 3,022,382, is shown in outline. The equipment added in this invention is shown in heavier outline. Only that portion of the Ewin teachings which are required for an understanding of the present invention will be given herein. For a comprehensive description of the universal concentrator shown in outline form in FIG. 1, reference may be made to the Ewin patent which is herewith incorporated by reference.

The remote unit shown in FIG. 1 includes illustratively one hundred lines, 00–99 (only one being shown), which are connected via the line and cutoff relays 104 to the crosspoint network 102. A relatively smaller number of concentrator trunks couple the crosspoint network 102 of the remote unit to the crosspoint network 101 of the control unit. As is apparent, the remote unit is designed to provide a convergence of a larger number of substation lines to a smaller number of concentrator trunks leading to the control unit at the central office through a crossbar switching network.

The control unit at the central office is, in part, similar to the structure of the remote unit but provides for a reexpansion or divergence whereby the relatively smaller number of concentrator trunks are adapted to be switched through the crossbar network 101 to a number of line terminations including sleeve and cutoff relays 103 in the control unit. These terminations are thereafter individually extended to an equal number of terminations in the central office. The latter, shown in outline form as the central office line and cutoff relays, are, in fact, the existing conventional telephone line terminations to which the line would have been connected if direct connections were made from a substation to each line termination instead of connections through the concentrator. Thus in the present arrangement, each line is provided with a line relay and cutoff relay 104 at the remote unit of the concentrator, a sleeve relay and cutoff relay 103 individual to the line at the control unit and, in addition, the conventional (pre-existing) line and cutoff relays in the central office.

The manner in which the additional circuitry, including the early dial tone auxiliary circuit 121, is incorporated in combination with the universal concentrator may be more readily comprehended by briefly examining the operation of the concentrator in the manner prior to the incorporation of the early dial tone auxiliary circuit.

On an originating call the line relay at the remote unit is adapted to operate in a manner similar to that of the conventional line relay in the central office. Since the line relay at the remote unit is unique to the substation line, the identification of the line may be derived from the operation of the relay. In the Ewin disclosure, individual connections were made from the line lockout and identification circuit 118 to the line relays in circuit 104. Line lockout and identification circuit 118 included groups of relays operable in coded combinations to reflect the identification of the line. In response to the off-hook condition of the line and the operation of a line relay unique to the line, a pair of identification relays are operated in circuit 118 as shown in detail in FIG. 3 herein and also in FIG. 3 of the Ewin patent. Operation of the pair of relays uniquely identifies the line and in turn operates various signal relays in the signal circuit 114 in a manner related to the particular identification relays which were operated in circuit 118. The signal relays are utilized to transmit the identification information to the control unit and to cause registration of the transmitted information in register 117 of the remote unit and register 107 of the control unit simultaneously.

Initially, the signal relays are operated in accordance with the so-called group information to specify if the calling line is in the group 00–49 or 50–99.

When the registration has been completed, the checking circuits 116 and 111 release the signal relays and the sequence control circuits 115 and 112 are advanced. Thus far the group information has been registered in registers 117 and 107.

When the sequence control relays have operated, the signal circuits 110 and 114 are again energized, this time in response to a particular relay in the line lockout and identification circuit 118 which indicates the "B" portion of the line number. Again the signal relays 7S1–7S4 in signal circuit 114 and 13S1–13S4 in signal circuit 110 are operated to transmit and receive the "B" portion of the line number, which information is simultaneously registered in registers 117 and 107 and checked by checking circuits 116 and 111.

After the check is completed, sequence control circuits 115 and 112 are once more advanced in preparation for transmitting the single remaining portion or "A" part of the line number. Once more the signal relays 7S1–7S4 and 13S1–13S4 are activated under control of the relay in the line lockout circuit 118 indicative of the "A" portion of the line number, and register circuits 107 and 117 are simultaneously loaded in response to the signal relays 7S1–7S4 and 13S1–13S4 to register the "A" information. When the "A" information has been checked by circuits 116 and 111, the sequence control circuits 112 and 115 are advanced to the final position.

Thus far the information has been transmitted in a direction from the remote unit to the central office to indicate the identity of the calling line. The last item of information to be transmitted is the identity of the trunk which has been selected by the control unit in circuit 108 for connection to the calling line. Obviously, since this information originates at the central office in circuit 108, the next item of information relating to the trunk number will be transmitted in the opposite direction, i.e., from the control unit to the remote unit.

At this juncture, however, it is significant to observe that all of the information necessary to completely identify the line has already been registered in registers 117 and 107.

Nevertheless, following the procedure taught by Ewin, the line information is retained in the registers and an idle available trunk is selected in the control unit at the central office in the trunk selecting circuit 108. The control circuit then initiates a connection of the selected trunk to the appropriate line terminals in the control unit at the central office and prepares paths for operating the appropriaate select magnets in the crossbar networks 101 and 102. After a number of checking operations, the trunk number is transmitted to the remote unit by appropriate operation of the signal relays 13S1–13S4 and 7S1–7S4 in response to information delivered by the trunk selecting circuit 108 and the trunk information is registered simultaneously in registers 107 and 117.

When the trunk information has been recorded, a circuit is completed for releasing the cutoff relay unique to the line at the line and cutoff circuit 104 and the sleeve and cutoff circuit 103 and for operating the trunk hold magnets in the networks 101 and 102. This completes the process of setting up the call and causes the control unit and the remote unit to prepare their common equipment for release. When the release of both units is accomplished, the line is connected to the trunk through magnetically latched hold magnets. The only other relays which remain operated are the cutoff relays in both units which are also magnetically latched thereby providing a "clean" (no bridging impedances) tip and ring connection between the line and the office.

At this time the line off-hook condition is transmitted over the completed connection from the calling line, the crosspoint network 102, selected idle trunk, crosspoint network 101 through the line terminations in circuit 103 to the conventional or existing line terminations shown in outline form as the central office line and cutoff relays. So far as the latter conventional terminations are concerned, the off-hook condition is viewed in the same manner as that of any line which is directly connected to the office. As a result, in a No. 5 crossbar system, for example, the off-hook condition at the conventional line termination in the office will result in the summoning of a marker circuit which in turn will select an idle originating register as described further herein. After the No. 5 crossbar circuitry has connected the originating register to the calling line termination, the calling subscriber may begin to dial the called number.

This, in brief, completes the arrangement taught by Ewin and described in detail in the above-referred-to patent. It is apparent from the above that after the transmission of complete line information to the office, the calling subscriber must nevertheless encounter several cumulative delays including the connection of an idle trunk to the calling line, the summoning of a marker in the conventional office equipment, selection of an idle originating register and connection of the register to the calling line.

In the present invention, the above cumulative time delays are truncated at the lower portion by the addition of auxiliary circuitry 121 shown and connected in outline form in FIG. 1. The circuitry 121 described in detail in FIG. 3 is utilized in the present invention to intervene in the above conventional series of sequential operations immediately upon reception of the "A" information indicating that a complete line identification has been received at the control unit register 107. In essence, the structure in circuitry 121 functions to bypass subsequent operations by forthwith supplying a fictitious "off-hook" condition to the appropriate terminals of the calling line which are, in fact, the conventional terminals in the central office. Upon application of the artificial off-hook condition, the No. 5 crossbar equipment, since it cannot discern that other than a legitimate service request is being made, initiates the conventional pattern of operations for establishing a dialing connection by summoning a marker to choose an idle dial pulse register. It is important to recognize that the latter sequence of events is being undertaken even though no actual trunk connection exists between the calling line and the central office. As a result, the pattern of operations for selecting a trunk transmitting the trunk information and operating the appropriate switches in the remote unit and control unit networks proceeds relatively concurrently with the selection of an originating register in the No. 5 crossbar office. In consequence, when the trunk connection has been established, an originating register may conceivably already be connected to the conventional line terminals to apply immediate dial tone to the calling substation line. At this time the fictitious off-hook condition is supplanted by the "legitimate" off-hook condition at the substation line and the subscriber may immediately begin dialing in lieu of waiting for the connection of a dial pulse register as in the past.

Having discussed in general outline the over-all operation of the universal concentrator disclosed by J. C. Ewin, a description, also in general outline, of the particular operation of the present arrangement in combination with a universal line concentrator of the Ewin type and a No. 5 crossbar office of the type disclosed in the above-referred-to Busch patent follows. This description will be succeeded by a specific description of the detailed circuitry employed to truncate the time required to furnish dial tone to a calling subscriber.

Referring now to FIG. 2, an outline diagram of portions of the universal line concentrator of FIG. 1 together with an outline diagram of portions of the No. 5 crossbar equipment are shown.

On the advent of an off-hook condition at substation 20, a group of relays including an "A" identification relay and a "B" identification relay are energized as described above. In FIG. 2, all aspects of the universal line concentrator of FIG. 1 which are not concerned with the actual crosspoint network but instead represent control equipment are grouped for purposes of clarity in the respective common equipment units 25 and 22. In response to the operation of the "A" and "B" identifying relays in common equipment 25 indicative of the calling line identity, signaling equipment is energized in the common equipment to deliver the calling line identity to the control unit signal circuit included within common equipment 22, all as described above. Early dial tone auxiliary circuit 121 is energized immediately upon receipt of the full line identification (group, "B" and "A" information), as explained in detail herein, to apply a ground condition to the conventional existing line relay 23 in the line line circuit of the No. 5 crossbar office individual to the calling concentrator line. It will be noted that relay 23 is operated prior to the extension of a connection from the control unit to the remote unit over trunk 24.

In response to the operation of line relay 23, the line link frame in accordance with conventional No. 5 crossbar practice, as described in detail in the above-referred-to Busch patent, actuates the line link marker connector to select an idle marker and thereupon transmits to the marker the identity of the line represented by line relay 23. The marker thereupon determines the equipment locational (physical location) of the calling line and selects a trunk link frame having an idle originating register and a channel between the line and the register.

After the marker selects the trunk link frame and an idle channel between the subscriber line and the originating register, it operates the select and hold magnets required to close through the channel via the line link connector and trunk link connector. The marker then releases its associated connectors and itself and leaves in the register the calling line equipment location. The register now furnishes dial tone to the line termination and is ready to receive any dialed digits.

During the above sequence of events, that is, while an originating register is being selected and connected to the line termination associated with line relay 23, a concurrent sequence of operations is being performed within the concentrator equipment, the ultimate result of which is to select an idle trunk (e.g., trunk 24) and to connect the calling substation through the trunk to the termination in the central office associated with the calling line and connected to line relay 23. As a result, the originating register in the No. 5 crossbar office may provide dial tone to the line termination prior to the extension of a connection from the line termination to the calling substation line.

In fact, the connection of an originating register to the line termination in the central office may take place even if no trunk is available for extension to the calling line in view of an all-trunks busy condition. Under these circumstances, the originating register will be released after an appropriate "time-out" period during which no dialing has taken place, as explained in the above-referred-to Busch patent.

If an idle trunk is available, however, the off-hook condition to line relay 23, theretofore presented by the early dial tone auxiliary circuit 121, is supplanted by the conventional off-hook condition due to the closed switchhook contacts at substation 20 immediately upon the extension of a connection from the line termination to the substation.

*Detailed description*

Figure 1:
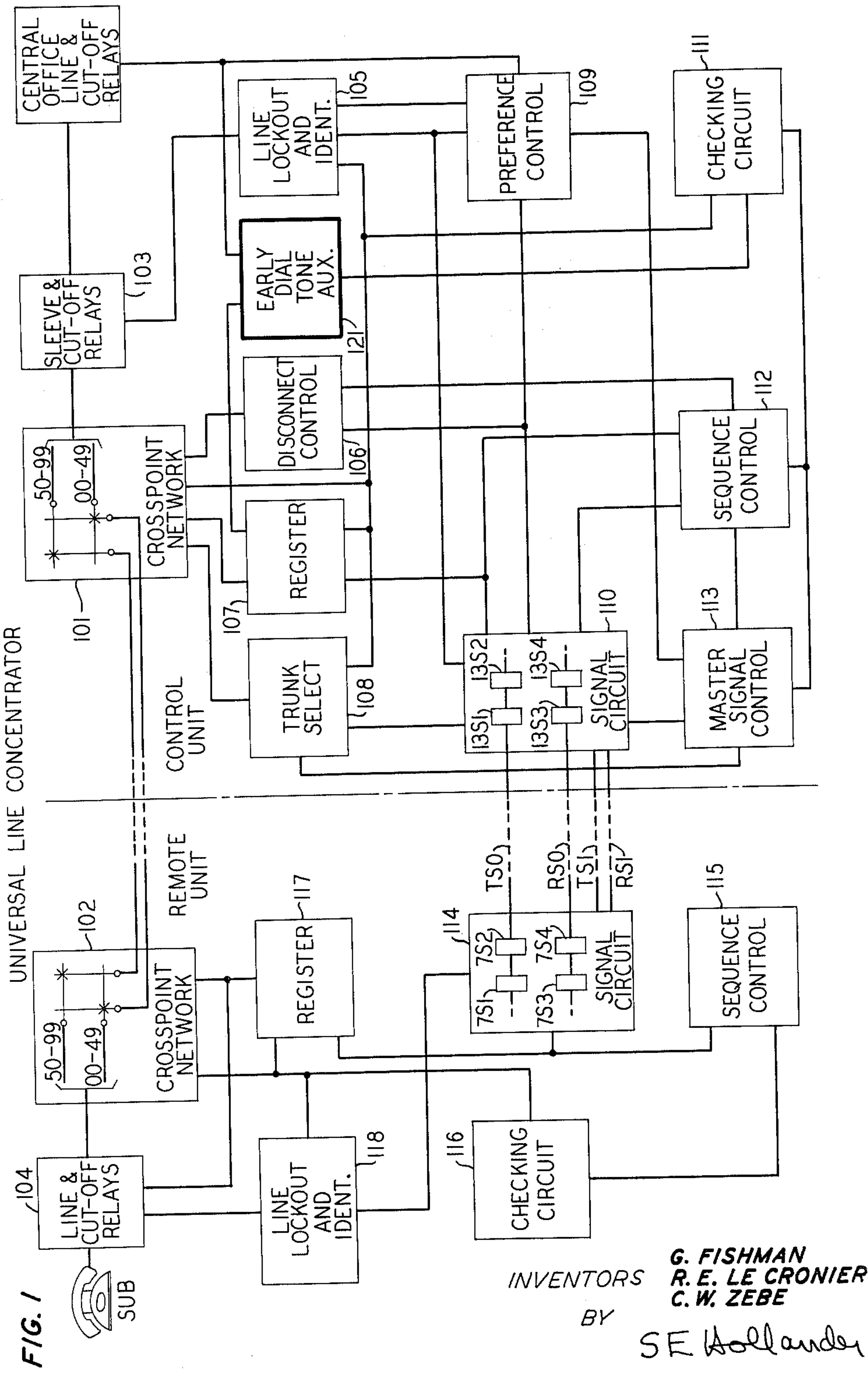
Figure 3:
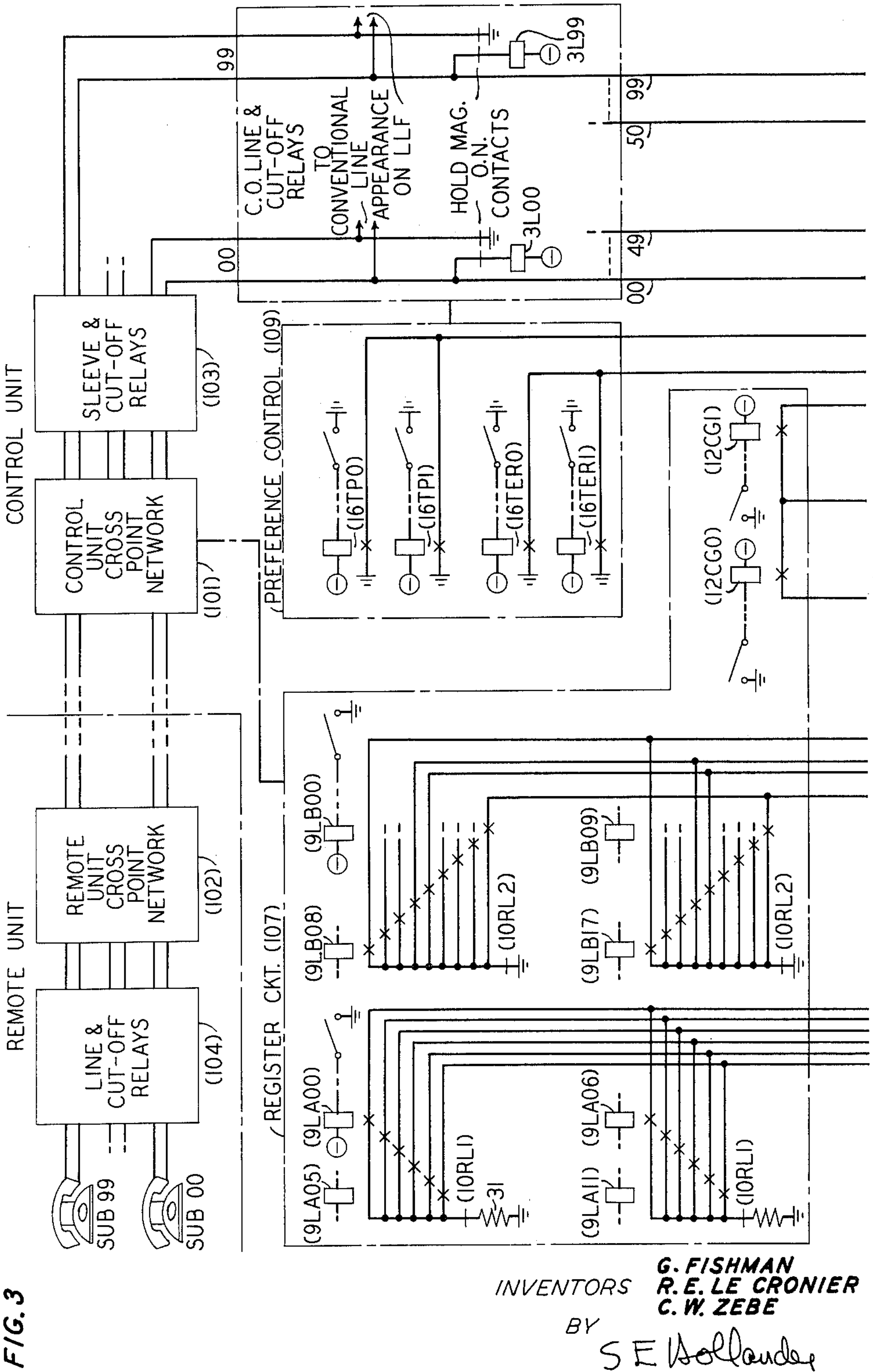
Figures 4, 5:
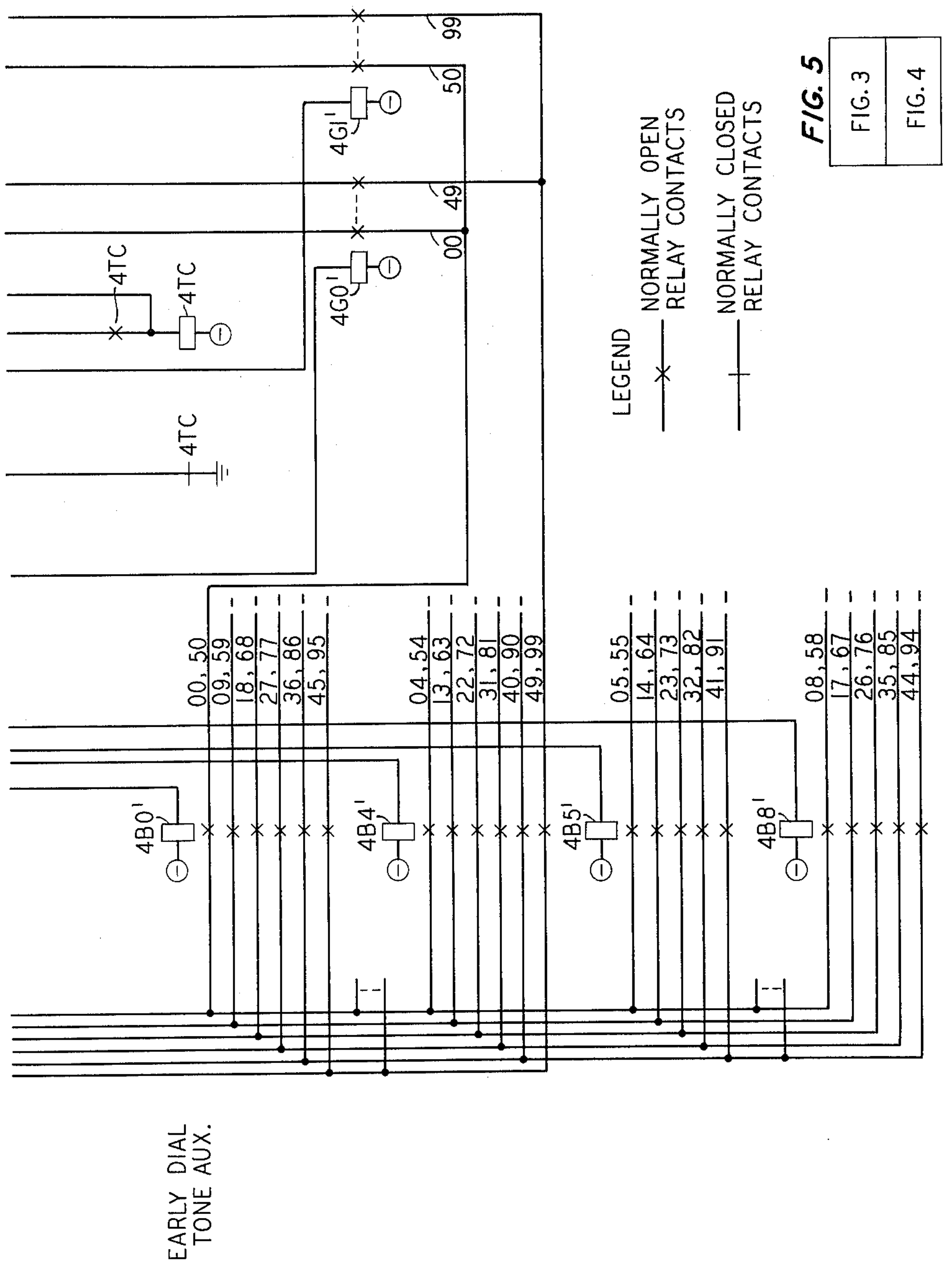

It will be assumed for purposes of illustration and referring to FIGS. 3 and 4 that the subscriber at substation 00 has lifted his receiver and the switchhook contacts at the substation have been closed to provide an off-hook condition to the remote unit line relay in equipment 104 of FIG. 1. As explained in the general description, this initiates the operation of signaling circuitry for transmitting the line identity to the remote unit. Ultimately, the group relay corresponding to the group in which the calling line is located is operated in the register circuit 107 as explained in detail in the above-referred-to Ewin patent. For clarity in disclosing the improvement in the present invention, the equipment in FIGS. 3 and 4 already disclosed in Ewin carries the same reference designations employed in the Ewin patent with the exception that they are indicated in parentheses in FIGS. 3 and 4.

Operation of group relay 12CG– in the register circuit of Ewin indicates the group in which the calling line is located. Moreover, the appropriate relays 9LA– and 9LB– are operated in the register circuit of Ewin to uniquely identify the calling line as described in detail therein. In the present illustration, relay 12CG0 is operated in response to signals transmitted over the signaling circuit as well as relays 9LB00 and 9LA00. For clarity, however, these relays are shown in FIG. 3 as being symbolically operated by manual switches.

In consequence, a path may now be traced from ground, normally closed contacts of relay 4TC, contacts of relay 12CG0, winding of relay 4G0′ to operate relay 4G0′. As a result of the operation of relay 4G0′, the ring conductors of lines 00–49 of group 0 are extended to the contacts of relays 4B0′–4B8′.

Since, as discussed above, relay 9LB00 has been operated, a circuit is completed for the operation of relay 4B0′ over a path including ground, contacts of relays 10RL2, 9LB00, winding of relay 4B0′ to negative battery.

A path is now completed for the operation of relay 3L00 which is the conventional central office line relay to which substation 00 would have been connected if directly connected to the office. This path may be traced from ground, resistance 31, contacts of relay 10RL1, contacts of relay 9LA00, contacts of relay 4B0′, contacts of relay 4G0′, off-normal contacts of the hold magnet unique to line 00, winding of relay 3L00 to negative battery. It is thus seen that line relay 3L00 has been operated immediately upon the receipt in the central office register circuit 107 of the information defining the calling line identity. Moreover, as indicated above, this function is performed prior to or contemporaneous with the selection of a trunk to the calling line and the extension of the line over the trunk to the central office.

Also as indicated above in general outline, the operation of relay 3L00 results in the summoning of an originating register in the No. 5 crossbar central office.

When the concentrator completes its function of establishing the connection through the remote and control units, the hold magnets in the crosspoint networks 101 and 102 are operated and the release relay 10RL1 in the concentrator is operated, as described by Ewin, which removes the ground connection applied by the early dial tone auxiliary circuit. Moreover, when relay 10RL2 is operated in conjunction with the release of the common equipment in the concentrator, also as taught by Ewin, the operated relay 4B0′ along with relay 12CG0 are released which in turn releases relay 4G0′ to restore the early dial tone auxiliary circuit to normal.

*Terminating call*

When relay 16TP1 or 16TP0 is operated as a result of a terminating call to a concentrated line as described in detail in the Ewin disclosure and shown symbolically in FIG. 3, a path may be traced in the early dial tone circuit from ground, contacts of relay 16TP0 (assuming that the called line is 00), winding of relay 4TC to negative battery. The operation of relay 4TC opens the contacts thereof in series with the windings of relays 4G1′ and 4G0′ to prevent operation of the early dial tone auxiliary circuit on a terminating call. Relay 4TC locks operated over the contacts of relay 16TER1 and its own contacts.

*Disconnect call*

As disclosed in detail in the Ewin patent, neither relay 12CG1 nor 12CG0 is operated on a disconnect call and, in consequence, no path is provided for the operation of relay 4G0′ or 4G1′. Accordingly, the early dial tone start circuit is not enabled at this time.

*Service denial call*

Also as explained in detail in the Ewin disclosure, relay 16TP0 or 16TP1 is operated on a service denial call in accordance with the group in which the called line appears thereby resulting in the operation of relay 4TC which locks operated over the contacts relay 16TER1 or 16TER0 and its own contacts, again disabling the early dial tone circuit.

As a result, the only instance in which early dial tone is provided is on an originating call which is as required.

Figure 2:
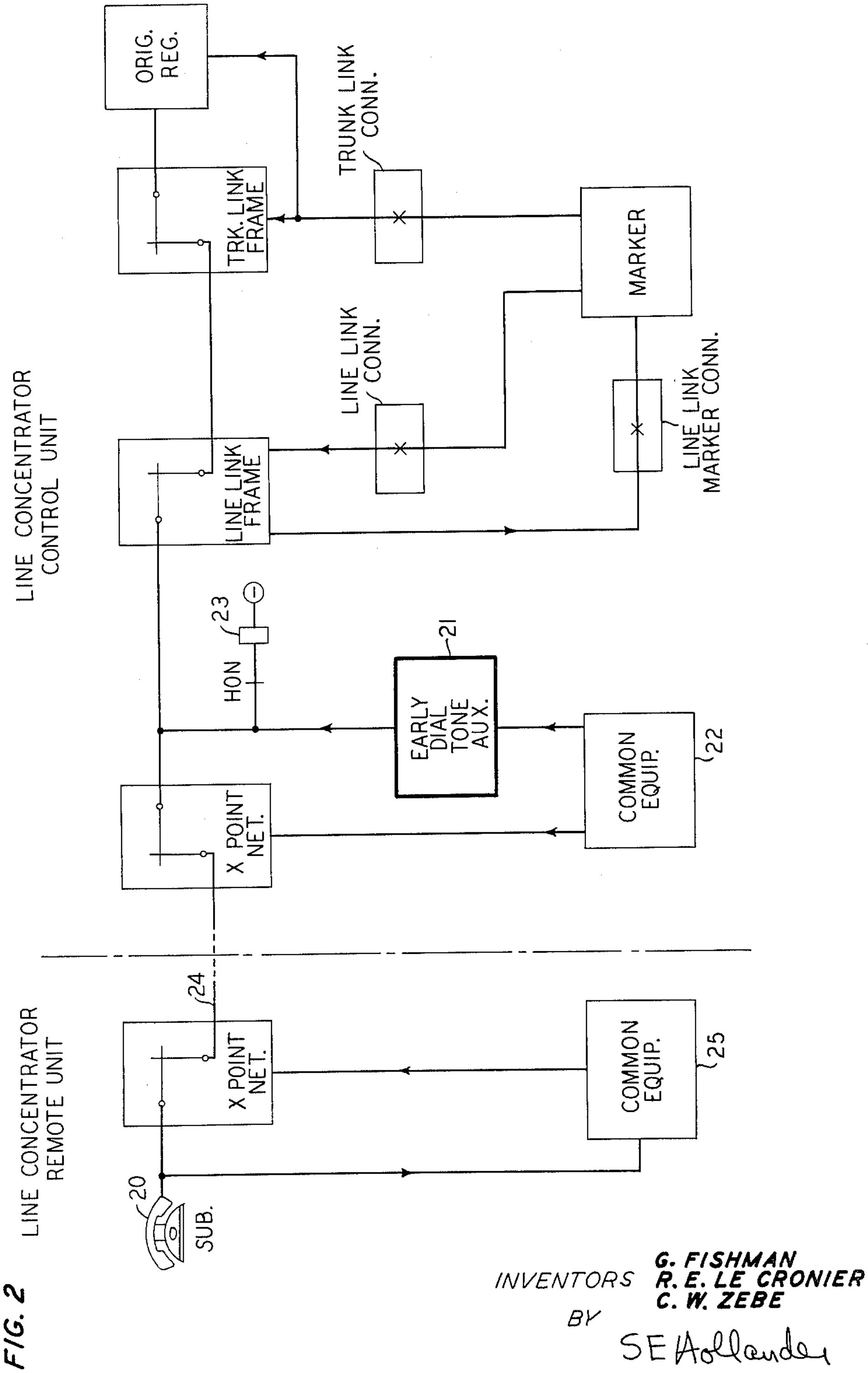

It will also be noted that the ground condition over resistance 31 on an originating call is supplanted by a shunt between the tip and ring represented by the closed switchhook contacts of the calling substation over the selected trunk if no originating register has as yet been connected. If the register is already connected to the calling line terminal in the office, the hold magnet off-normal contacts are operated to release the line relay 3L00 and the concentrator trunk is connected to the originating register when the networks 102 and 101 are closed as described for FIG. 2.

It is to be understood that the above-described arrangements are illustrative of the application of the principles of the invention. Numerous other arrangements may be devised by those skilled in the art without departing from the spirit and scope of the invention.

What is claimed is:

1. A telephone line concentrator system comprising a central office, a plurality of remote substation lines, a lesser plurality of trunks extending from said office, remote switching means for connecting said lines to said trunks under control of said office, called station identity register means in said office, and additional means in said office responsive to a calling condition on one of said lines for conditioning said register means for reception of the called station identity prior to the extension of a connection to said service requesting line over one of said trunks.

2. A telephone line concentrator system comprising a central office, a plurality of substation lines, a lesser plurality of trunks extending from said office, remote switching means for connecting said lines to said trunks under control of said office, a plurality of line terminations in said office individual to said substation lines, called station identity register means in said central office connectable to said line terminations, and means in said office responsive to an off-hook condition on a calling one of said lines for coupling said register means to one of said line terminations in said office unique to said calling line prior to the connection of one of said trunks to said calling line.

3. A universal telephone line concentrator system including a plurality of telephone lines, a lesser plurality of trunks, a telephone central office, remote switching means for connecting said lines to said trunks under control of said office, control switching means for connecting said trunks to said office, identification storage means in said control switching means effective during an originating call on one of said lines to store the identity of said calling line, selecting means in said control means responsive to the storage of the identification of said line for selecting a trunk for connection to said calling line, called station identity register means in said office, a plurality of line terminations in said office individual to said lines and connectable to said register means, and additional means in said office responsive to the completion of storage of said calling line identification by said storage means for coupling said called station register means to said calling line termination concurrently with the selection of a trunk for connection to said calling line by said selecting means.

4. A universal telephone line concentrator system including a number of substation lines, a telephone central office, a lesser number of trunks, remote switching means for connecting said lines to said trunks, control switching means for connecting said trunks to said office, identifying means in said remote switching means responsive to a calling condition on one of said lines to indicate the identification of said line, identifying means in said control switching means responsive to said identification of said line to indicate a corresponding identification, register means in said control switching means operable for registering said identification of said calling line, trunk selecting means in said control switching means operable for extending a trunk to said calling line, a plurality of line terminations in said central office individual to said lines, additional means in said control switching means for energizing a particular one of said line terminations indicative of said identified line, called station information storage means in said central office, and means responsive to the energization of said line termination for connecting said storage means to said line termination concurrently with the operation of said trunk selecting means.

5. An early dial tone auxiliary circuit for use with a universal line concentrator system arranged to connect a relatively larger number of lines over a smaller number of trunks to a telephone central office including means at said central office responsive to the identification of a calling line for energizing a line termination in said office corresponding to the identity of the calling line, additional means for extending a connection to said calling line over a selected idle trunk, and means for releasing said energizing means after the extension of a connection to said line.

6. A universal telephone line concentrator system including a number of substation lines, a telephone central office, a lesser number of trunks, remote switching means for connecting said lines to said trunks, control switching means for connecting said trunks to said office, a plurality of line terminations in said central office uniquely representative of said lines, an early dial tone auxiliary circuit in said control switching means, and means in said control switching means responsive to control signals over said trunks representative of a service request call on a particular line for actuating said early dial tone circuit to energize said line termination in said central office representative of said service requesting line prior to the extension of a connection over one of said trunks to said service requesting line.

7. A telephone line concentrator system including a plurality of remote substation lines, a telephone central office, a lesser plurality of trunks extending from said office, remote switching means for connecting said lines to said trunks under control of said office, a plurality of sensory devices in said central office individual to said lines, and means in said central office responsive to signals over said trunks indicative of an off-hook condition on one of said lines for energizing said sensory device in said office individual to said off-hook line prior to the extension of a connection over one of said trunks to said line.

8. A telephone line concentrator system including a plurality of remote substation lines, a telephone central office, a lesser plurality of trunks extending from said office, a plurality of line terminations in said office individual to said lines, dial pulse register means in said office, and means responsive to control signals over said trunks indicative of an off-hook condition at one of said lines for initiating the connection of said dial pulse register means to said line termination individual to said calling line prior to the extension of a trunk connection to said calling line.

9. An early dial tone auxiliary circuit for use with a telephone line concentrator system arranged to connect a relatively greater number of lines over a smaller number of trunks to a central office including line identification register means in said office operable for registering the identification of a calling line, a plurality of line terminations in said office individual to said lines, and means responsive to the operation of said line identification register means for energizing the line termination individual to a calling line prior to the extension of a speech connection over said trunks to said calling line.

10. An early dial tone auxiliary circuit for use in a telephone line concentrator system including a telephone central office, calling line identification register means in said office, called line identification register means in said office, a plurality of line terminations in said office each individual to a particular calling line, means responsive to the identification of a calling line by said calling line identification register means for initiating a connection between said called line register means and a particular line terminal representative of a calling line prior to the extension of a connection between said office and said calling line.

11. A universal telephone line concentrator system including a telephone central office, a plurality of lines remote from said office, a lesser plurality of trunks extending from said office, remote switching means for connecting said lines to said trunks under control of said office, control switching means for connecting said trunks to said office, signaling means in said remote switching means and said control switching means for transferring signal information, register means in said remote switching means and said control switching means, means in said remote switching means responsive to an off-hook condition at one of said lines for energizing said remote signaling means to transfer the identification of said calling line to said register in said remote switching means and said register in said control switching means, a plurality of line terminals in said central office individually representative of said lines, and additional means in said control switching means effective upon the registration in said register means of said calling line identification to actuate said line termination individual to said calling line prior to the extension of a trunk connection to said calling line.

12. A universal telephone line concentrator system including a plurality of substation lines, a telephone central office, a lesser plurality of trunks connected to said office, remote concentrator means for connecting said lines to said trunks, a plurality of sensory devices in said office individually responsive to said lines to indicate the service condition thereof, a plurality of sensory devices in said remote switching means individually responsive to said lines to indicate the service condition thereof, register means in said remote switching means responsive to the operation of a particular remote sensory device representative of a calling line for storing the identification thereof, register means in said control switching means responsive to signals over said trunks for storing the identification of the same calling line, and additional means in said control switching means responsive to the operation of said control register means for actuating said sensory device in said office individual to said calling line prior to the extension of a trunk connection to said calling line.

13. A telephone line concentrator system including a telephone central office, a plurality of remote substation lines, a lesser plurality of trunks connected to said office, remote switching means for connecting said lines to said trunks under control of said office, control switching means for connecting said trunks to said office, a plurality of line relays at said remote switching means individual to said lines, a plurality of line relays at said central office individual to said lines, signaling means in said remote switching means and said control switching means for transferring signal information therebetween, register means in said remote switching means and said control switching means, means in said remote switching means responsive to the energization of one of said line relays in said remote switching means representative of a calling line for operating said signaling means to store the identification of said calling line in said register means, means normally responsive to the storage of said line identification in said register means at said control switching means and the extension of a trunk connection to said calling line to energize said line relay in said central office individual to said calling line, and additional means in said control switching means effective upon the storage in said registration means at said control switching means of said calling line identification for actuating said line relay in said control switching means representative of said calling line prior to the operation of said normal means.

No references cited.

ROBERT H. ROSE, *Primary Examiner.*

WILLIAM C. COOPER, *Examiner.*